July 14, 1925.
H. L. WALKER
TORQUE ARM ATTACHMENT
Filed Dec. 31, 1920
1,545,537
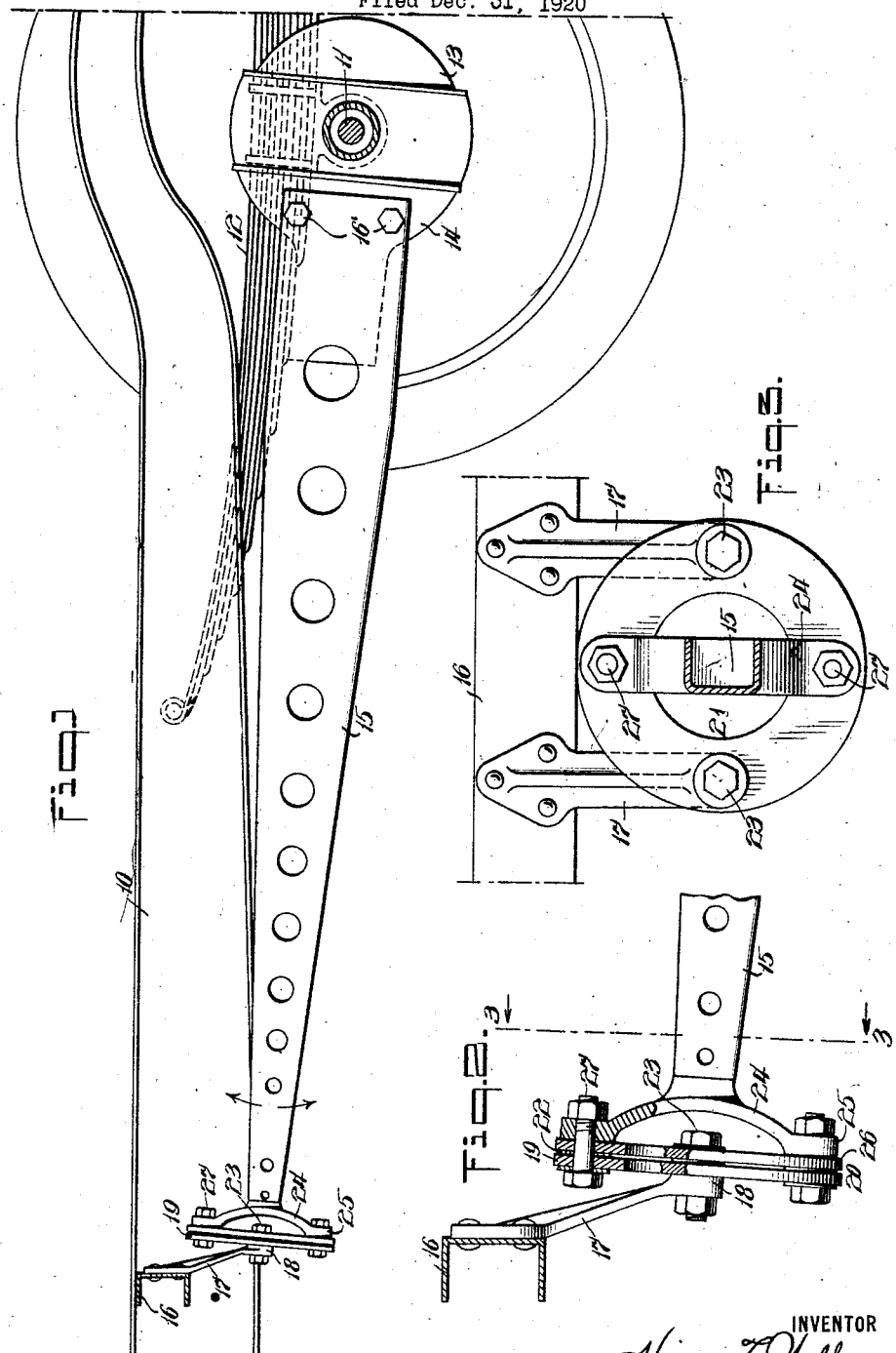
INVENTOR
Hiram L. Walker
BY
Albert M. Austin.
ATTORNEYS Patented July 14, 1925.

1,545,537

UNITED STATES PATENT OFFICE.

HIRAM L. WALKER, OF CLEVELAND, OHIO, ASSIGNOR TO CHANDLER MOTOR CAR COMPANY, OF CLEVELAND, OHIO, A CORPORATION OF OHIO.

TORQUE-ARM ATTACHMENT.

Application filed December 31, 1920. Serial No. 434,360.

*To all whom it may concern:*

Be it known that I, HIRAM L. WALKER, a citizen of the United States, and resident of Cleveland, in the county of Cuyahoga and State of Ohio, have invented certain new and useful Improvements in Torque-Arm Attachments, of which the following is a specification.

The invention relates to an improved form of torque or radius rod connection between a chassis and axle construction of an automotive vehicle and particularly relates to an improved form of flexible connection between the usual torque arm and the chassis or frame structure of the vehicle.

It is required in such constructions that any torque action generated by the revolving axle and which might tend to rotate the axle casing be restrained and absorbed and at the same time that the casing be free to have the requisite relative movement permitted by the chassis springs. In such constructions now known it is usual to provide some form of metallic spring connection between the torque arm and the chassis. However, these known constructions possess inherent objections, both on the ground of excessive cost of manufacture and installation and, what is even more serious, the connection loses its efficiency in time and must be replaced. Metallic springs have the additional disadvantage in that the constant vibration to which they are subjected while in use eventually sets up a crystalizing action in the metal which renders metallic springs functionally inoperative after extensive use and further the movement of parts on each other creates frictional resistance and wear. In order to neutralize the resistance between the parts it has been suggested to lubricate the relatively movable parts but this introduces the objectionable necessity of constantly supplying lubrication. In these known constructions much effort has been expended in providing resilient members such as the proper size springs which will be inherently elastic so as to restore parts to their normal position when stretched out of that position by the permissible operation of the torque arm and this refinement in design and construction has added an unnecessary expense and complication to the structure which is not necessary in those situations, such as automotive constructions, where the chassis springs are ample to restore the flexible connection to its normal position incidental to the ordinary functioning of the chassis springs.

Accordingly, one of the objects of the invention is to provide a simplified form of connection between the torque arm and the chassis which will retain all of the advantages inherent in approved forms of torque arm constructions of the class outlined and which will be free from crystallizing or similar destructive tendencies; which will be free of the resistance of relatively movable parts; which will not require lubrication and in which economy of construction is featured, both by simplicity of parts, by the elimination of refined machining and by the elimination of functional attributes not necessary to its functioning simply as a flexible connection.

In its broad aspect I attain these objects simply by positioning a flexible, non-elastic cushion between the torque arm and the chassis. In a more refined embodiment of the invention it is suggested, on the ground of economy and efficiency in operation, that the flexible member be designed with its maximum dimension in the line of resistance to the tendency of the torque arm to rotate and that it have a relatively small dimension in the direction in which the torque arm is intended to have its requisite freedom of movement.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

While the invention is described herein in connection with the torque arm of an automotive vehicle construction it is of course to be understood that the situation herein discussed is merely illustrative of one situation in which the invention can be installed and that the invention can be utilized with obvious necessary mechanical changes in any situation where a limited freedom of movement is desired and permitted between two members while resisting the tendency of one of the members to rotate about a contained axis.

In the accompanying drawings:

Figure 1 is a view largely diagrammatic of the rear portion of an automotive vehicle frame with a torque arm connection with the axle showing a preferred embodiment of the invention installed therein;

Figure 2 is an enlarged view of the forward end of the torque arm shown in Figure 1 and with parts of the connection featured in this disclosure broken away to show details of construction; and Figure 3 is a transverse sectional view taken on the line 3—3 of Figure 2 looking in the direction indicated by the arrows.

In the following description and in the claims, parts will be identified by specific names for convenience of expression but they are intended to be as generic in their application to similar parts as the art will permit.

In the drawings there is shown part of an automotive vehicle including a frame or chassis 10, a drive shaft or axle 11 and connecting chassis springs 12. The axle is surrounded by an axle casing or housing 13 to a forwardly extending portion 14 of which is fastened the rear end of a forwardly extending torque arm 15 secured thereto by means of bolts 16'. The forward end of the torque arm is fastened to a cross bar 16 forming part of the chassis 10. It will be understood that the device as thus described is of conventional form and the showing is intended to be simply representative of a well known construction.

The member 16 is provided with a pair of transversely disposed hanger brackets 17, the lower, outer face of each of which brackets provides a seat 18 for the forward element 19 of a pair of connected flexible members 20. The flexible members are each of some form of non-elastic material, such as leather, and in the form disclosed the members are in the form of flat disks with central aligned openings 21 and spaced apart by a ring washer 22. The flexible members are fastened together and to the brackets 17 by means of through bolts 23. It will be seen from Figure 3 that the bolted connections 23 are 180° apart considered circumferentially of the members and are horizontally disposed, that is, the connections with the chassis are disposed horizontally and transversely of the length of the chassis. The forward end of the torque arm is bifurcated to form a vertical extending bracket 24, the ends of which are enlarged to form bearing hubs 25 constituting bearing faces for engaging the rearmost disk 26 of the flexible members 20. Bolts 27 pass through the hubs 25, through the disks 19 and 26 and through the washer 22 to hold the parts in fixed relation. It will be noted, from Figure 3, that the bolted connections provided at 27 are vertically spaced apart 180° and are spaced from the connections 23, 90° apart considered circumferentially so that there is a freedom of movement in the material of which the disks are formed between the points 27 and 23. This permissible movement is resisted simply by the tendency of the flexible member to maintain its configuration. However, as the flexible member is not intentionally made resilient, any resistance between the points is negligible except the resistance in the direction which the torque arm tends to move about the axis of rotation of the axle, or, as hereinafter identified, about the axis of the axle casing 13. As the flexible member cannot be stressed in the direction of its plane any tendency of the torque arm to rotate in either an upward or downward direction is restrained and there is thus provided, in effect, a rigid connection between the torque arm and the chassis in the direction of rotation of the torque arm.

On the contrary there is little, if any, resistance to any tendency of the torque arm to move longitudinally for it is of course possible to flex the members 20 out of their normal planes. In this way it is possible to provide limited movement of the casing in the direction along its axis of rotation, to permit of a rotary movement of the casing about an axis perpendicular to the axis of rotation of the axle or the casing has a freedom of movement in three planes at right angles to each other. In other words, there is provided the requisite limited freedom of movement between the chassis and axle casing in all directions except the rotary direction about the axle of the casing. As the leather, or equivalent flexible member, is not required to transmit rotary torque, the disks can be made of relatively small thickness, the smaller the better, and, as a matter of fact, the limit to the thickness in minimum dimension is defined by the necessity to provide sufficient material to resist buckling under the stress of rotary movement of the torque arm. As there is no relative movement between the parts frictional wear is eliminated as well as the necessity for lubrication. Even in case the flexible members should deteriorate for any reason whatsoever they can be replaced simply by cutting a ring of leather, or other material, and no particular care need be exercised to insure any accuracy of fit. A roughly formed leather washer from an old piece of belting is ample as a repair part.

While I have shown and described and have pointed out in the annexed claims, certain novel features of my invention, it will be understood that various omissions, substitutions and changes in the form and details of the device illustrated and in its operation, may be made by those skilled in the art, without departing from the spirit of the invention.

Having thus described my invention, I claim:

1. In an automotive vehicle, the combination with a chassis and an axle casing, said chassis including a pair of relatively fixed supporting means depending therefrom and spaced apart transversely of the length of the chassis, a flexible, flat, ring-shaped, non-metallic and non-crystallizing member disposed in a transverse plane and secured at two spaced apart points to said pair of fixed supporting means, a longitudinally extending torque arm having a greater vertical than transverse dimension secured at one end to the axle casing and provided at its opposite end with a bifurcated bracket provided at the end of each bifurcation with a readily demountably securing means, said means being vertically spaced apart and engaging the flexible member at points in circumferentially spaced relation to the points of engagement between the supporting means fixed to the chassis and the flexible member, whereby torque action generated in the casing by the contained axle is absorbed by the distortion of a non-crystallizing member which does not require lubrication and at the same time the axle is free to respond to the requisite relative movements between the axle and chassis.

2. In an automotive vehicle, the combination with a chassis and an axle casing, said chassis including a pair of relatively fixed supporting means spaced apart transversely of the length of the chassis, a plurality of flat flexible disks disposed in a transverse plane and secured at two spaced apart points to said fixed supporting means, a longtiudinally extending torque arm secured at one end to the axle casing and provided at its opposite end with a bifurcated bracket provided at the end of each bifurcation with a readily demountably securing means, said means being vertically spaced apart and engaging the flexible member at points in circumferentially spaced relation to the points of engagement between the supporting means fixed to the chassis and the flexible member, said securing means also acting to fasten the flexible disks together.

3. In an automotive vehicle, the combination of two relatively movable parts comprising a chassis and an axle casing, a torque arm, and means for securing opposite ends of the torque arm to said parts, one of said securing means comprising a flexible connection in which the flexible element is flat substantially non-elastic and in which flexing forces tend to produce a bodily distortion of the normal configuration in the direction of its least dimension in distinction to relative movement of different parts.

4. In an automotive vehicle, the combination of two relatively movable parts comprising a chassis and an axle casing, a torque arm, and means for securing opposite ends of the torque arm to said parts, one of said securing means comprising a flexible connection in which the flexible element is disk-shape substantially non-elastic and in which flexing forces applied thereto normal to its plane tend to produce a bodily distortion of the normal configuration in distinction from relative movement of different parts and resilient means between the movable parts, and distinct from torque arm connection and acting through the torque arm on the flexible member to restore the member to its normal configuration.

5. In an automotive vehicle, the combination of two relatively movable parts comprising a chassis and an axle casing, a torque arm, and means for securing opposite ends of the torque arm to said parts, one of said securing means including a disk-like flexible member perpendicular to said arm for resisting any material relative rotary movement while permitting to a limited extent all other relative movements between the axis of the casing and the chassis.

6. In an automotive vehicle, the combination of two relatively movable parts comprising a chassis and an axle casing, a torque arm extending longitudinally along the chassis, and means for securing opposite ends of the torque arm to said parts, one of said securing means including a flat flexible member extending transversely with respect to the chassis with the points of connection between the torque arm and the attached part in spaced relation, said member acting substantially to fix the torque arm against movement circumferentially of the axis of the axle casing while permitting other limited requisite relative movements between the casing and chassis.

7. In a device of the class described, the combination of an axle casing, a chassis, a torque arm fastened to the casing and a flexible plate normal to the arm constituting the sole connection for fastening the arm to the chassis and adapted to be bent out of its normal plane.

8. In a device of the class described, the combination with two members capable of limited relative movement, of means tending to resist rotary movement of one of the members about an axis while permitting other desirable slight relative movements, said means including a torque arm secured to one of the members and a flat flexible member perpendicular to the torque arm constituting the sole connection between the torque arm and the other member, said flexible connection being substantially inelastic.

9. In a device of the class described, the combination with two members capable of limited relative movement, of means tending to resist rotary movement of one of the members about an axis while permitting other desirable slight relative movements, said means including a torque arm secured to one of the members and a flat flexible member perpendicular to the torque arm constituting the sole connection between the torque arm and the other member, said flexible connection being substantially inelastic, and resilient means acting between the members and tending to maintain the same and the flexible connection in a normal relative position.

10. In a device of the class described, the combination with two members capable of limited relative movement, of means for restraining rotary movement of one of the members, said means including a torque arm fixed to the member having a tendency to rotate, a flat flexible connection between said torque arm and the other member, said connection having a relatively great dimension in the direction to resist the tendency of the arm to revolve and having a relatively small dimension in the direction parallel to said arm thereby to provide for a limited freedom of relative movement between the members in the direction of the connecting torque arm.

11. A torque arm structure comprising in combination with the chassis and rear axle housing of a motor vehicle, a torque arm secured at the rear to said axle housing and a connection for the forward end of said torque arm comprising a flat flexible member of sheet material, securing means on the chassis forward of the axle rigidly engaged with said sheet material at separated points and securing the same non-rotatably with the flat plane disposed transversely of the chassis and substantially vertical and spaced clamps at the forward end of the torque arm rigidly engaged with the sheet material at separated points located between the points at which the material is fixed to the chassis.

Signed at Cleveland in the county of Cuyahoga and State of Ohio this 21st day of December A. D. 1920.

HIRAM L. WALKER.